United States Patent

Yokoyama

Patent Number: 5,819,638
Date of Patent: Oct. 13, 1998

[54] DEEP-FRYING APPARATUS

[75] Inventor: Nobuyoshi Yokoyama, Toyoake, Japan

[73] Assignee: Paloma Industries, Ltd., Aichi, Japan

[21] Appl. No.: 890,287

[22] Filed: Jul. 9, 1997

[30] Foreign Application Priority Data

Aug. 5, 1996 [JP] Japan .................................. 8-223085

[51] Int. Cl.⁶ .............................. A47J 27/00; A47J 37/00; A47J 37/12; F24D 1/00
[52] U.S. Cl. .............................. 99/330; 99/403; 126/390; 126/391; 126/360 R; 431/1
[58] Field of Search .................... 99/330, 331, 403–410; 426/231, 233, 438, 579, 302, 305; 126/390–392, 275, 378, 92 R, 92 AC, 357, 360 R, 400; 210/DIG. 8, 167; 431/326, 170, 1; 122/24; 60/39.76

[56] References Cited

U.S. PATENT DOCUMENTS

| 3,938,948 | 2/1976 | Moore et al. | 431/347 |
|---|---|---|---|
| 3,948,593 | 4/1976 | Moore et al. | 431/8 |
| 4,289,111 | 9/1981 | Duncan et al. | 126/391 |
| 4,289,477 | 9/1981 | Moore et al. | 431/171 |
| 4,397,299 | 8/1983 | Taylor et al. | 126/391 |
| 4,715,807 | 12/1987 | Yokoyama et al. | 431/1 |
| 4,808,107 | 2/1989 | Yokoyama et al. | 99/330 X |
| 4,838,244 | 6/1989 | Giles, Sr. et al. | 126/391 |
| 4,848,317 | 7/1989 | Prudhomme et al. | 126/390 X |
| 4,848,318 | 7/1989 | Brewer | 126/92 AC |
| 4,863,370 | 9/1989 | Yokoyama | 431/1 |
| 4,947,824 | 8/1990 | Ejiri et al. | 99/403 |
| 4,955,805 | 9/1990 | Ishiguro et al. | 431/1 |
| 5,020,987 | 6/1991 | Ishiguro et al. | 431/1 |
| 5,038,753 | 8/1991 | Yokoyama | 99/403 |
| 5,402,713 | 4/1995 | King | 99/408 |
| 5,417,202 | 5/1995 | Cote | 99/330 |

*Primary Examiner*—Timothy F. Simone
*Attorney, Agent, or Firm*—Robin, Blecker & Daley

[57] ABSTRACT

A deep-frying apparatus includes an oil tank for holding cooking oil in which food is fried and a heating device for heating the oil. The oil tank includes a cooking zone in the upper portion of the tank and a cold zone in the lower portion of the tank. An air passage is located in the cold zone for cooking the oil in the cold zone and for providing heated combustion air to the heating device.

2 Claims, 5 Drawing Sheets

DEEP-FRYING APPARATUS

FIELD OF THE INVENTION

This invention is concerned with industrial frying equipment, and more particularly with deep frying equipment in which an oil tank, filled with cooking oil, is directly heated by a heating device.

BACKGROUND OF THE INVENTION

In conventional industrial frying equipment, fried food (such as fried potatoes) is prepared using cooking oil contained in an oil tank heated by a burner outside the tank. The top part of the oil tank is used as a cooking zone where the oil is warmed to a desired cooking temperature (for example, 160°–190° C.) and food is cooked. The bottom part of the oil tank is used as a cold zone where the temperature of the oil is lowered (around 100° C.) to prevent contamination by food debris and degradation of the oil. An example is illustrated in FIG. 5. Sloping walls 15A are formed on both sides of an oil tank and burners 3 heat the sloped walls 15A. The area above the sloping walls 15A is a cooking zone 11A and the area below the sloping walls 15A is a cold zone 12A. The oil in the cooking zone 11A is controlled to be at a desired cooking temperature. Food debris which breaks off during cooking falls down to the cold zone. The temperature of the oil in the cold zone is lower then the temperature of the oil in the cooking zone so that the food debris falling down to the cold zone does not turn into carbon. Thus, the equipment prevents contamination and degradation of oil. However, convection currents in the oil tank 10A, as indicated by the arrows in FIG. 5, transfers heat to the cold zone 12A and increases temperature. Increased temperature turns food debris into carbon or induces it to break into much smaller pieces which contaminates the oil. In addition, convection currents may carry food debris into the cooking zone 11A and contaminate the food being cooked. One of the methods to prevent these from happening is to further separate the cold zone 12A from the cooking zone 11A. This separation should be a considerable distance and at the same time, the cold zone 12A should be filled with water. Thus, the convection flow is prevented and falling food debris is kept at a lower temperature. Hence, the oil tank 10A must be made very long in the vertical direction. This makes the equipment bulky. In addition, there is a danger that, if the stored water is stirred by mistake, it boils violently and hot oil may splash out.

OBJECTS AND SUMMARY OF THE INVENTION

It is an object of the invention to provide a deep-frying apparatus in which degradation of the cooking oil is minimized without making the oil tank bulky or the apparatus less safe.

It is a further object of the invention to provide a deep-frying apparatus in which the oil in the cold zone is cooled and heated combustion air is provided to the heating means.

In a preferred embodiment of the invention, there is provided a deep-frying apparatus including an oil tank for holding cooking oil in which food is fried and a heating device for heating the cooking oil in the tank. The upper portion of the oil tank of this frying apparatus is used as a cooking zone where cooking oil is heated to a desired temperature by the heating device, and food is cooked. The bottom portion of the oil tank is used as a cold zone, where food debris accumulates.

In the frying apparatus of the invention, an air passage passes through the cold zone. Cooling air flows through the air passage to cool the cooking oil in the cold zone. After the cooling air passes through air passage in the cold zone, it is supplied as combustion air to the flame of the heating device.

The temperature of the oil in the cold zone is reduced as a result of the cooking air flowing through the air passage in the cold zone. Thus, food debris which falls into the cold zone is kept at a lower temperature and is prevented from turning into carbon or being oxidized. Therefore, oil does not degrade from being mixed with fine particles of carbonified food debris. Another benefit is that the cooking oil can be used for longer periods of time. In addition, the oil tank is not bulky and the safety of the apparatus is not compromised because of the way in which the structure of the air passage passes through the cold zone of the oil tank. The air passing through the air passage is heated while it cools the oil in the cold zone. This air is then supplied as combustion air to the flame of the heating device. Hence, the combustion air for the flame is preheated. Therefore, the temperature of the flame is increased and the heating efficiency is improved.

DESCRIPTION OP THE DRAWINGS

DESCRIPTION OF PREFERRED EMBODIMENT

Figure 1:
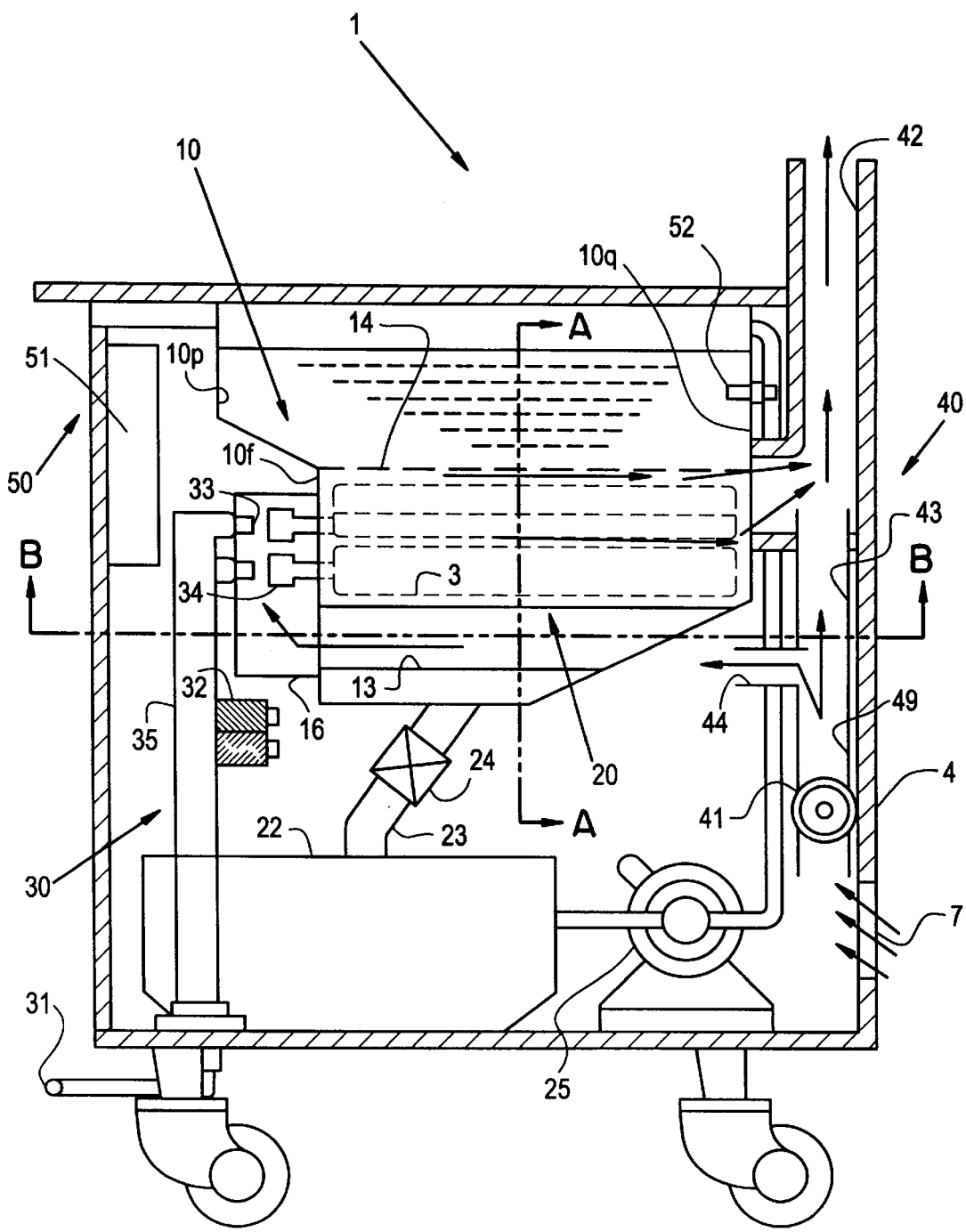
FIG. 1 is a cross-sectional side view of a frying apparatus provided in accordance with the invention.

An embodiment of the invention will now be described, initially with reference to FIG. 1. In FIG. 1, reference numeral 1 generally indicates a frying apparatus. The frying apparatus 1 includes an oil tank 10, a heating device 20, and a housing 4. The oil tank 10 is filled with cooking oil in which food is fried. The heating device 20 includes burners 3 which heat the cooking oil contained in the oil tank 10. The oil tank 10 and heating device 20 are housed within the housing 4.

Figure 2:
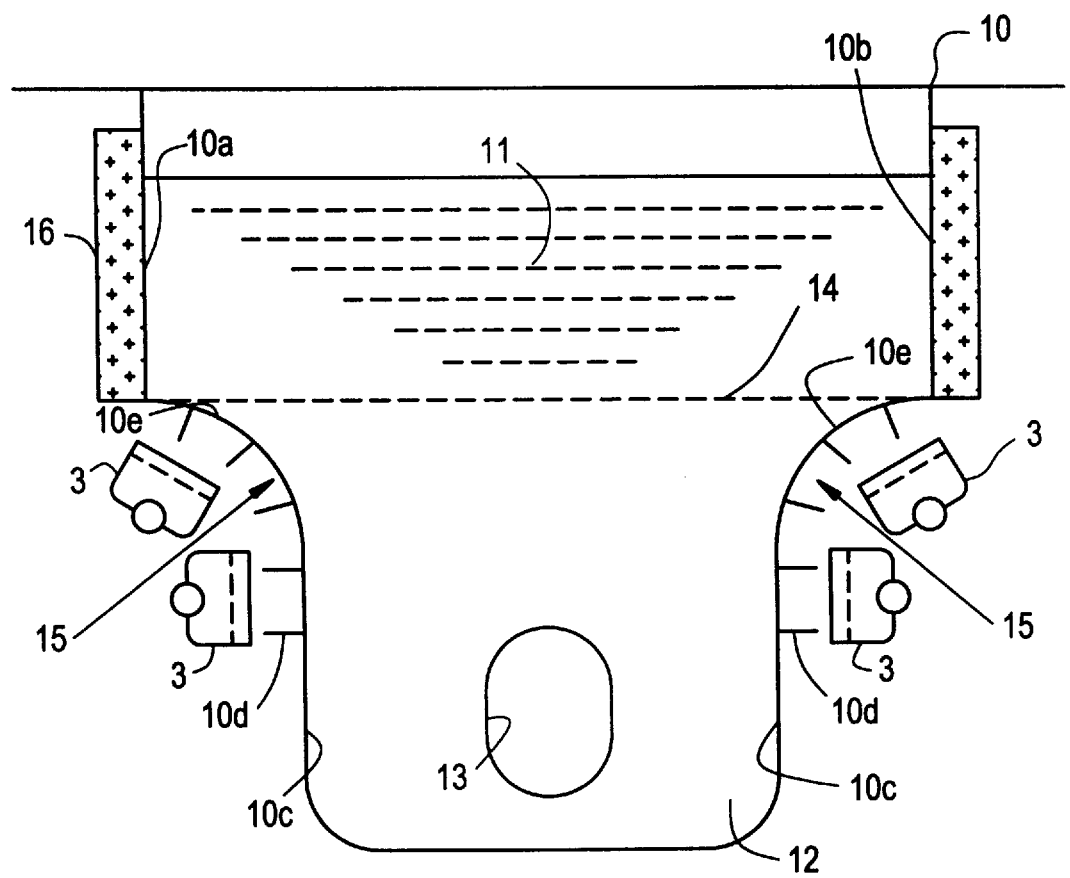
FIG. 2 is a front cross-sectional view, taken at a line A—A of FIG. 1, of an oil tank that is part of the frying apparatus of FIG. 1.
Figure 3:
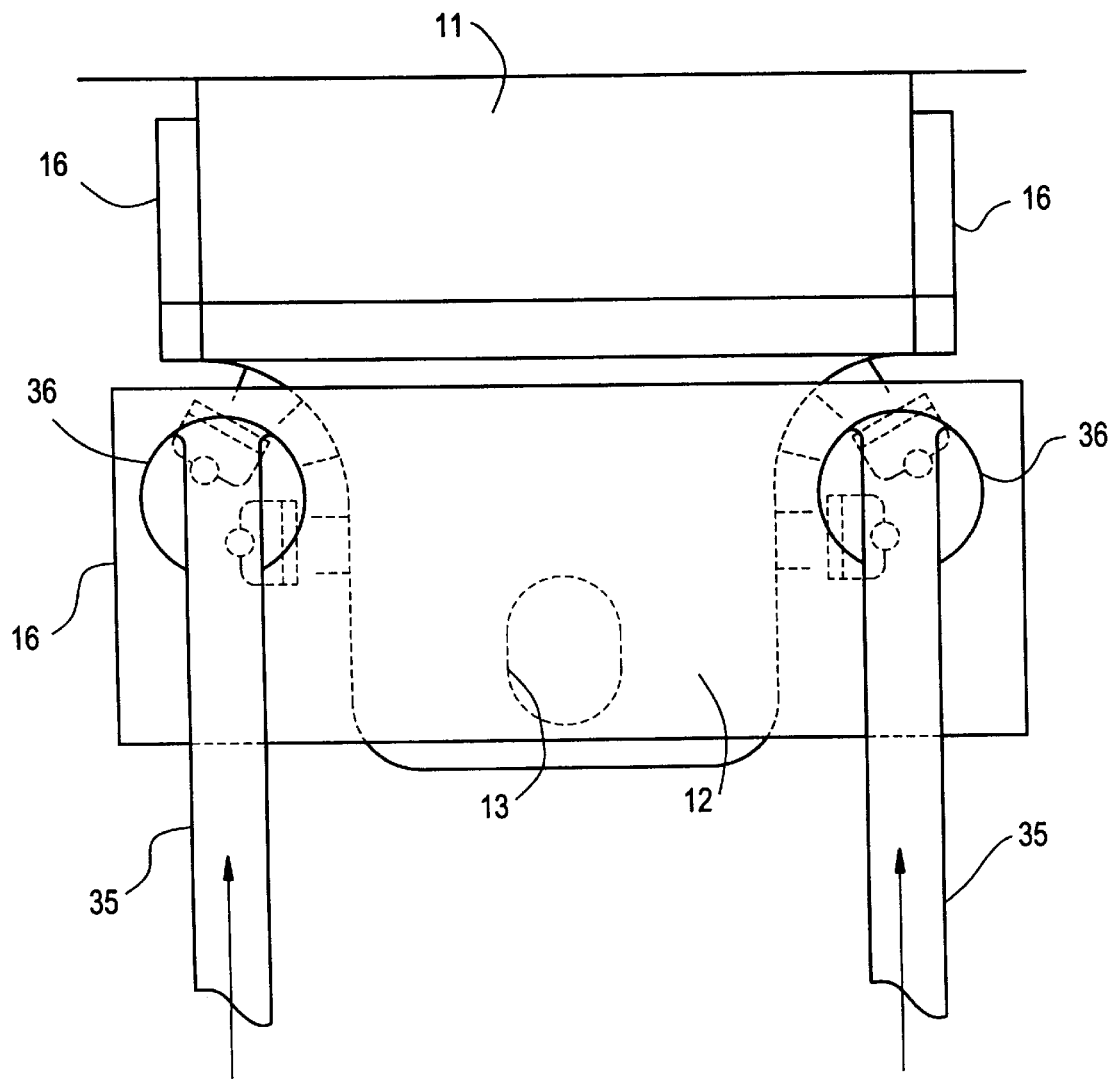
FIG. 3 is a front view of the frying apparatus of the invention.

As shown in FIG. 2, right and left sides of the oil tank 10 include sloping walls 15. The area above the sloping walls 15 functions as a cooking zone 11 where oil is heated to a desired temperature and food is cooked. The area below the sloping walls 15 functions as a cold zone 12 which prevents food debris from turning into carbon and, hence, prevents oil from being contaminated and degraded prematurely. The cooking zone 11 is the area surrounded by left and right upper side walls 10a and 10b, a front wall 10p, and a back wall 10q. The middle section of the front wall 10p slopes down to the cold zone 12. Insulators 16 are attached to the outside of the upper sidewalls 10a and 10b. A screen 14 is provided near the border between the cooking zone 11 and the cold zone 12. The cold zone 12 lies below the screen 14 and is surrounded by the lower side walls 10c, a front wall 10f and the back wall 10q.

A pipe 13 passes through the cold zone 12 from the front to the back of the oil tank 10. The pipe 13 is located a short distance above the bottom of tank 10. The pipe 13 is the air passage. It has an elliptical cross section and is made from a stainless steel cylinder which has excellent anti-corrosion performance. The pipe 13 may be welded to the front and back walls of the oil tank 10.

The sloping walls 15 comprise curved heating walls 10e which connect the upper side walls 10a and 10b and the lower side walls 10c. Several plate fins 10d are welded onto the outside of the heating walls 10e. The fins 10e run from the front to the back of the tank and are welded to the heating walls 10e.

An oil drain pipe 23 is provided at the bottom of the oil tank 10. A valve 24 has a closed and open position. When the valve 24 opens, oil with food debris is connected to a filtration tank 22. The filtered oil flows back to the oil tank 10 by a circulation pump 25.

Figure 4:
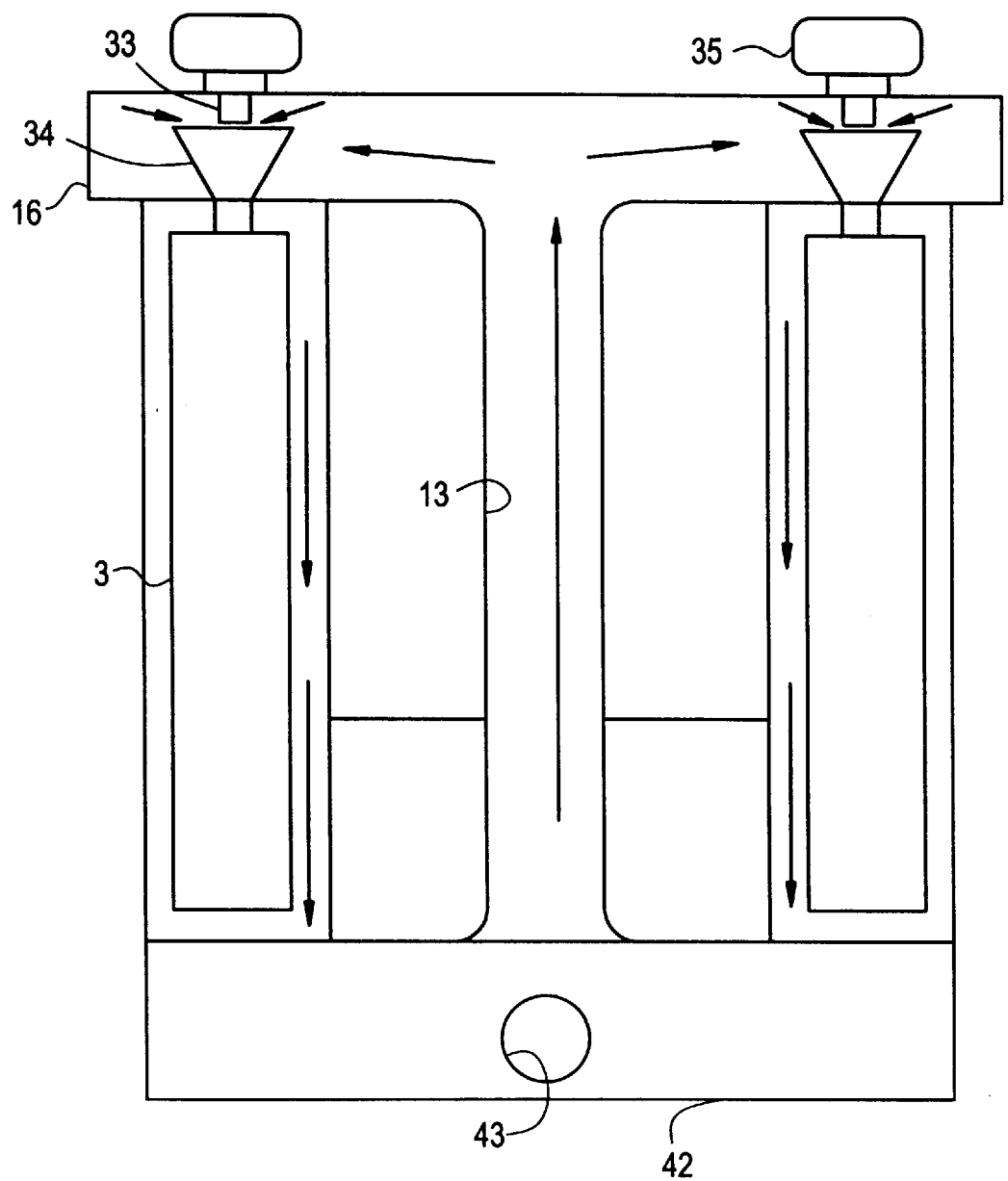
FIG. 4 is a horizontal cross-sectional view of the frying apparatus of the invention.
Figure 5:
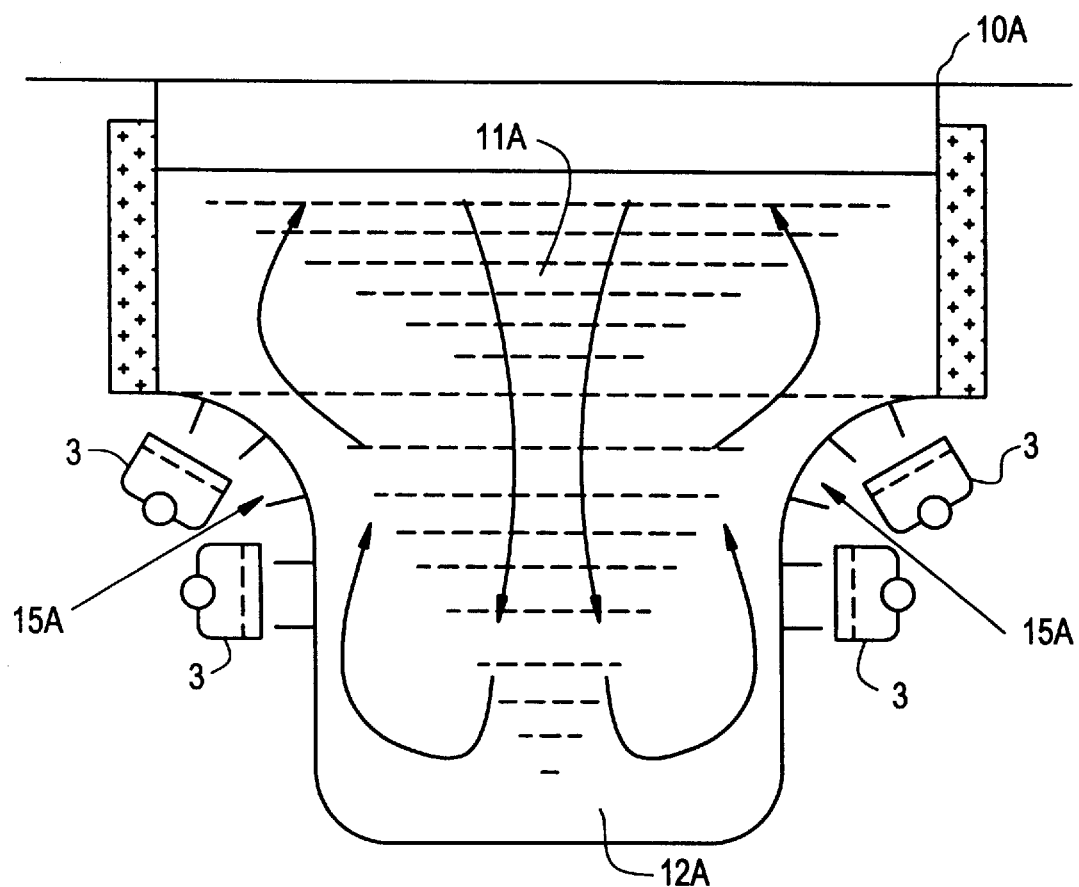
FIG. 5 is a view showing the prior art.

As shown in FIG. 1, FIG. 2 and FIG. 4, the heating device 20 comprises burners 3, a fuel supply section 30, an air supply/exhaust section 40 and a flame controller 50. The burners 3 are placed adjacent to the sloping walls 10b and heat the sloping walls 10b. The fuel supply section 30 supplies fuel to the burners 3. The air supply/exhaust section 40 supplies air to the burners 3. The flame controller 50 controls the burners 3 and the temperature of the oil tank 10. The burners 3 use a ceramic plate with multiple flame orifices. The burners are of the totally primary air combustion system which produce a flame on the front surface of the ceramic plate. Two, upper and lower burners, are positioned along the fins 10d provided on each of the two heating walls 10e. The fuel supply section 30 comprises a gas inlet 31, electromagnetic gas valves 32, and gas nozzles 33. The base inlet 31 is fixed under the bottom surface of the housing 4. The electromagnetic gas valves 32 are located between the gas inlet 31 and the gas nozzles 33 and open and close base flow passages 35. The gas nozzles 33 are located where the fuel enters the burners 3 and inject fuel into the burners. The fuel supply section 30 supplies fuel to the burners 3. Primary combustion air to the burners 3 is supplied when the gas flow from gas nozzles 33 induces surrounding air into openings 34.

Flame controller 50 comprises a microprocessor 51, and a temperature sensor 52 located in oil tank 10. Based on the signals from the temperature sensor 52, the controller opens and closes the electromagnetic gas valves 32 and switches the flame on and off (on- and off-controls), so that the oil temperature is maintained within a desired temperature range.

The air supply/exhaust section 40 includes openings 7 in the housing 4, an air supplier/exhaust pipe 49, a fan 41, and outlet pipe 42, a pipe 13 and an air box 16. The outlet of the air supply/exhaust pipe 49 is divided into an exhaust pipe 43 and an air supply pipe 44. The air supply/exhaust pipe 49 supplies and exhausts air. The fan 41 is located in the air supply/exhaust pipe 49. The outlet pipe 42 is connected to the exhaust pipe 43 or one of the outlets of the air supply/ exhaust pipe 49, and opens upward in the rear section of the equipment. The pipe 13 passes through the middle of the cold zone 13 of the oil tank 10 from the front to the back, and provides air from the air supply pipe 44 to the burners 3. As shown in FIG. 4, the square air box 16 covers the front exit of the pipe 13. Nozzle holders 36 are formed at the end of the gas flow passages 35. Both the nozzle holders 36 and the nozzles 33 are fixed on airbox 16. As illustrated in FIG. 1 and FIG. 4, air is supplied by taking outside air through openings 7 in the housing. Air flow provided by fan 41 supplies air to the air inlet of the pipe 13 which then supplies air to air box 16 and finally to burners 3. Exhaust gas generated by combustion of fuel and air in burners 3 exits in housing 4 by means of a jet of air flowing through exhaust pipe 43. The jet of air through exhaust pipe 43 is created when the fan 41 blows air through the supply/exhaust pipe 49 to the outlet pipe 42 and sucks out the exhaust gas. By mixing the exhaust gas with air, the heat load on the outlet pipe 42 is lessened and its overheating is prevented.

The operation of the frying apparatus 1 will now be explained. After the oil tank 10 is filled with oil, the burners 3 are ignited by opening the electromagnetic valve 32, and turning on the air supply/exhaust fan 41 and an ignition device (not shown). When the radiation from the burners 3 heats the fins 10d on the sloping walls 15 and the heating walls 10e, the temperature of the cooking oil in the vicinity of the heating walls 10c increases. As the temperature of the cooking oil increases, the cooking oil rises along walls 10e and reaches cooking zone 11. At the same time, cooking oil having lower temperature in cold zone 12 circulates toward heating walls 10e. The cooking oil in the middle of cooking zone 11 moves downward to cold zone 12. Thus, a convection flow of the cooking oil occurs. When the oil in the cooking zone 11 reaches a desired temperature (e.g., 160°–190° C.), a basket with food (such as slices of potato) is immersed in the oil in the cooking zone 11 and rested on the screen 14. Thus, cooking is performed.

During cooking, fan 41 supplies air through air supply pipe 44 and the pipe 13 to the burners 3. Thus, the oil in the cold zone is always maintained at a cooler temperature. The cold zone temperature is preferably maintained at approximately 100° C. Hence, when food particles and fried food debris fall into the cold zone during cooking, they do not turn into carbon and are not oxidized. Finer food particles are not formed because the food debris is not carbonized. Therefore, degradation of the oil which occurs when food debris turns into carbon is reduced. The cooking oil needs to be changed less frequently and the operation of such an equipment becomes more economical. In addition, the air supply to the burners is preheated when the air passes through the pipe 13, the flame has a higher temperature, and the oil tank is heated with a hotter flame. Thus, heating efficiency is improved. Furthermore, the embodiment shown in which there is an air passage in the cold zone, does not compromise the compact size of the oil tank or the safety of the apparatus.

It will be recognized that further modifications may be made to the foregoing embodiments without departing from the invention. The particularly preferred embodiments disclosed herein are thus intended in an illustrative and not limiting sense. For example, while this embodiment uses infrared burners which heat the oil tank from outside, a type in which a heating device is provided within the tank can also be used. The burners can be of a pulse-, gun-, or catalysis-type. The true spirit and scope of the invention is set forth in the following claims.

What is claimed is:

1. A deep-frying apparatus, comprising:
    an oil tank for holding cooking oil in which food is fried;
    heating means for heating said cooking oil;
    said oil tank having an upper portion comprising a cooking zone wherein said oil is heated by said heating means to a desired temperature for cooking said food;
    said oil tank having a bottom portion comprising a cold zone where food debris accumulates and which is at a lower temperature than the oil temperature in the cooking zone; and
    an air passage through said cold zone for the flow of air through said passage to cool said cooking oil in said cold zone.

2. An apparatus according to claim 1, wherein the air passing through said air passage is then supplied as combustion air for the heating means.

* * * * *

UNITED STATES PATENT AND TRADEMARK OFFICE
CERTIFICATE OF CORRECTION

PATENT NO. : 5,819,638
DATED : October 13, 1998
INVENTOR(S) : Nobuyoshi Yokoyama It is certified that error appears in the above-identified patent and that said Letters Patent is hereby corrected as shown below:

Col. 3, line 29, delete " electromagnetic " and insert --electro-magnetic--.

Col. 3, line 31, delete "electromagnetic " and insert --electro-magnetic--.

Col. 3, line 41, delete "electromagnetic " and insert --electro-magnetic--.

Signed and Sealed this

Sixth Day of July, 1999

Attest:

Q. TODD DICKINSON

Attesting Officer

Acting Commissioner of Patents and Trademarks